Aug. 4, 1925.
J. R. EDLICH
STAKE AND SOCKET
Filed March 5, 1925
1,548,518
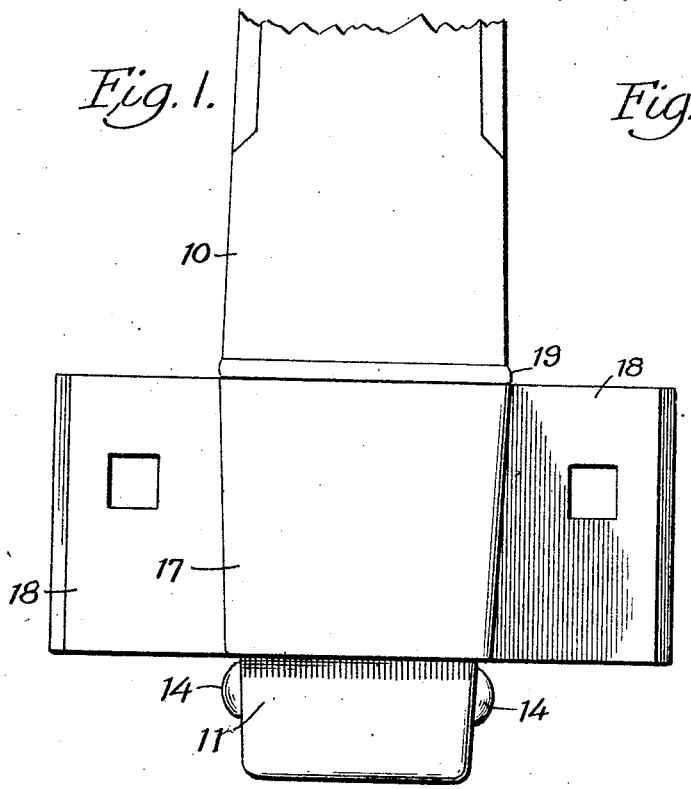
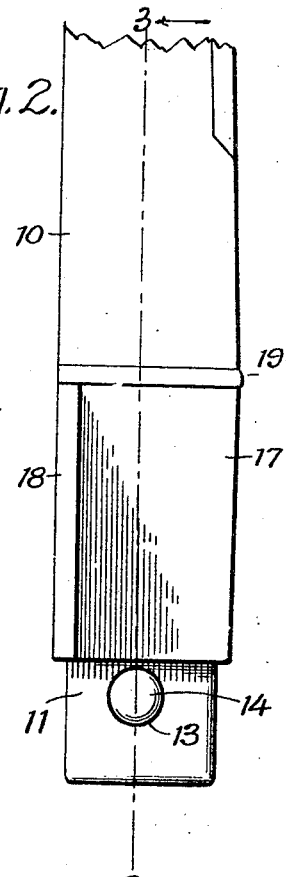
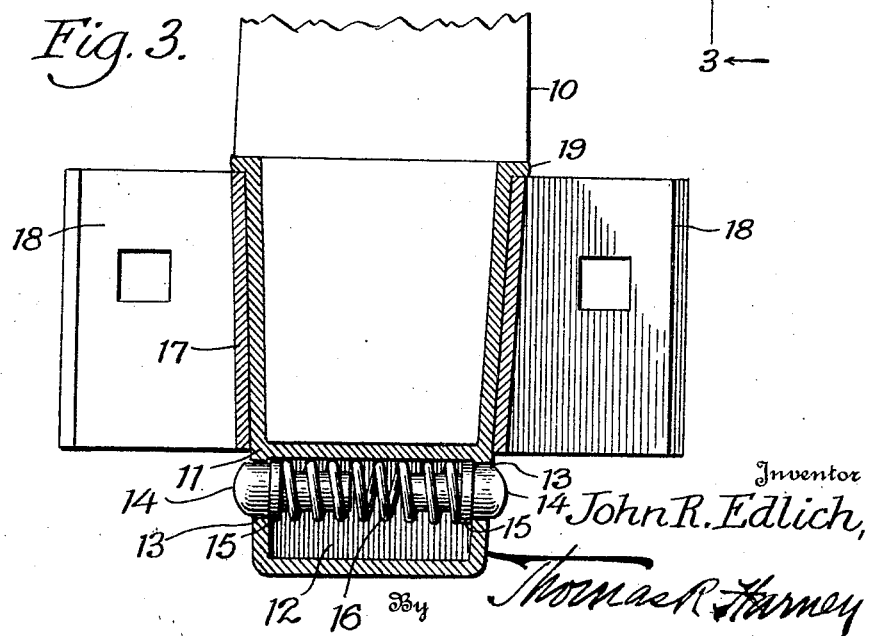
Inventor
John R. Edlich,
By Thomas R. Harney
Attorney Patented Aug. 4, 1925.

1,548,518

UNITED STATES PATENT OFFICE.

JOHN R. EDLICH, OF EAST ST. LOUIS, ILLINOIS.

STAKE AND SOCKET.

Application filed March 5, 1925. Serial No. 13,200.

*To all whom it may concern:*

Be it known that I, JOHN R. EDLICH, a citizen of the United States of America, residing at East St. Louis, in the county of East St. Louis and State of Illinois, have invented certain new and useful Improvements in Stakes and Sockets, of which the following is a specification.

My present invention relates generally to the stakes and stake pockets of commercial vehicles such as delivery wagons, trucks and the like and has for its main object the provision of a construction and arrangement of parts whereby a stake may be made to readily release from its pocket when release is desired and at the same time proof against accidental displacement.

In many instances the fact that the stakes remain properly in their pockets is the means of preserving valuable loads against injury and loss and likewise the means of avoiding injury to the persons or property of others. At present, to insure that the stakes remain in place they must be made to tightly fit the stake pockets, but this creates an undesirable condition as much time is subsequently lost in removing the stakes and frequently many stakes are ruined in so doing.

My invention aims to avoid the above disadvantages and provides such an apparatus that the stakes while securely guarded from accidental displacement, may be readily pulled from the stake pockets when desired.

In the accompanying drawing which illustrates my invention and forms a part of this specification, Figure 1 is a front elevation of my improved stake and stake pocket;

Figure 2 is a side view, and,

Figure 3 is a vertical section taken on line 3—3 of Figure 2.

Referring now to these figures, I have shown at 10 a stake of the character commonly utilized along the sides and rear end of delivery wagons and trucks. The lower end of the stake 10 is, in accordance with my invention enclosed by a socket 11 of tapering form, secured to the stake 10 in any suitable manner and provided at its lower smaller end with a chamber 12 below the lower end of the stake, the side walls of the socket having transversely alined openings 13 at opposite sides of chamber 12.

Disposed with their outer rounded ends slightly protruding beyond the side surfaces of the socket 11, through the openings 13, are a pair of studs 14 projecting partly across the chamber 12. These studs 14 have annular ribs 15 intermediate their ends which limited their outward movement and which are normally held in contact with the inner surfaces of the socket side walls by means of a coil spring 16 in the chamber 12, whose ends engage the ribs and surround the inner portions of the studs. Thus the spring 16 not only acts to yieldingly hold the studs in their projecting relation shown whereby they form latch studs, but also cooperates with the openings 13 in guiding the studs in their movements under, and against, the tension of said spring.

The stake pocket 17 is also of tapering form as shown, and is of such dimensions that the socket 11 when seated in the pocket has its lower latch carrying portion below the pocket. The stake pocket 17 preferably has lateral extensions 18 which in practice are bolted or otherwise fastened to the sides and ends of a vehicle bed and the socket 11 also preferably has short flanges 19 at its upper edge which rest on the upper edges of the stake pocket when the stake is in place.

In this way the stake, or rather the socket member 11 of the stake need not fit the stake pocket tightly as the slightly protruding latch studs prevent the stake from jolting out of the stake pocket or otherwise accidentally displacing. On the other hand these latch studs permit the stake to be pulled upwardly free of the stake pocket by a quick jerking movement. My invention thus provides a convenient effective solution to the problem involved, and is not only simple and inexpensive, but will be strong and durable in use.

I claim:

1. A stake having a socket at its lower end, said socket having a lower chambered portion adapted to project at its lower end below a stake pocket in use, and spring controlled latch members forming protuberances at opposite sides of the chambered lower portion of the socket to prevent accidental displacement of the socket from a stake pocket and to permit of readily pulling the stake from the pocket said members having their body portions housed within the chamber of the socket and protected and guided thereby.

2. A stake having a socket at its lower end, said socket having a lower chambered portion adapted to project at its lower end below a stake pocket in use, and spring controlled latch members forming protuberances at opposite sides of the chambered lower portion of the socket to prevent accidental displacement of the socket from a stake pocket and to permit of readily pulling the stake from the pocket, and a spring within said chambered portion of the socket engaging and controlling said members and also cooperating with the socket to guide the members in their movements.

In testimony whereof I have affixed my signature.

JOHN R. EDLICH.